United States Patent [19]

Bollerhey

[11] Patent Number: 4,681,607
[45] Date of Patent: Jul. 21, 1987

[54] DUST REMOVAL

[75] Inventor: Rolf Bollerhey, Kempen, Fed. Rep. of Germany

[73] Assignee: Mannesmann AG, Duesseldorf, Fed. Rep. of Germany

[21] Appl. No.: 744,505

[22] Filed: Jun. 13, 1985

[30] Foreign Application Priority Data

Jun. 14, 1984 [DE] Fed. Rep. of Germany ....... 3422093

[51] Int. Cl.⁴ .............................................. B01D 46/04
[52] U.S. Cl. ....................................... 55/284; 55/302; 55/303; 55/341 NT; 55/429; 55/431
[58] Field of Search ..................... 55/284, 96, 97, 302, 55/303, 341 NT, 350, 429, 432

[56] References Cited

U.S. PATENT DOCUMENTS

| 3,388,534 | 6/1968 | Jensen ..................................... 55/350 |
| 3,881,899 | 5/1975 | Spulgis .................................... 55/431 |
| 3,975,173 | 8/1976 | Peterson et al. ...................... 55/303 |
| 4,127,397 | 11/1978 | Onan et al. ............................ 55/431 |
| 4,244,715 | 1/1981 | Eisenbarth ..................... 55/341 NT |
| 4,460,389 | 7/1984 | Baum et al. ........................... 55/431 |
| 4,507,130 | 3/1985 | Roth ...................................... 55/284 |

FOREIGN PATENT DOCUMENTS 708919  7/1941  Fed. Rep. of Germany ........ 55/341 NT Primary Examiner—Bernard Nozick
Attorney, Agent, or Firm—Ralf H. Siegemund

[57] ABSTRACT

A dust pre-precipitator centrally supports a plurality of filters with dry filter elements; raw gas flows down in the pre-precipitator and emerges from the bottom thereof in a dust bag, and a reversal of gas flow obtains as it flows through the dust bag and into the filters through the respective inlets thereof; clean gas is extracted from the top of the filters, and cleaning gas can be selectively fed to them from the top thereof; each of the filters contains a funnel shaped transition, and a dust extraction device is disposed adjacent to a two-way flap so that counter flowing cleaning gas passing through said filter in down direction will be guided away from the dust bag into the extraction device.

6 Claims, 3 Drawing Figures

DUST REMOVAL

BACKGROUND OF THE INVENTION

The present invention relates to dedusting and dust removal of gas generally, specifically under utilization of a dust pre-precipitator or preliminary deduster and filters arranged downstream and operated in a dry method or mode, there being a dust bag or the like connected to a discharge part of the pre-precipitator for collecting some of the dust that has been removed from gas to be cleaned.

Arrangements of the type to which the invention pertains, use a flushing gas blower by means of which each filter container can be individually connected to a separate circuit for purposes of cleaning the filter elements and, under utilization of a relatively high flushing gas pressure as compared with the normal operating pressure. Also pure or clean gas is usually extractable at the discharge opening of the filter arranged in the upper part thereof.

Dedusting and dust removal equipment generally to which the invention pertains, are classified usually in a manner which considers the combination of filters and pre-precipitator operating as a unit, the filters themselves operate in parallel. In such a case it is possible, at least in principle, to take one of the filters temporarily out of the filter arrangement and to clean it in a counterflow method, while the remaining filters continue the dedusting operation. The cleaning requirement makes in fact a parallel operation of several filters mandatory, unless dedusting is to be interrupted in its entirety. In addition to the principle of parallel opertion it is necessary to move the dust from the filters in some fashion out of the system using preferably a short transport or moving past. Particularly, if dust is removed from the filters in a horizontal fashion, it was found that they easily cake together or form lumps.

German printed patent application corresponding to U.S. No. 29 27 317 corresponding to U.S. Pat. No. 4,244,715 suggests to connect several filter containers at their respective inputs directly to the pre-precipitator using separate raw gas tubes for the connection. Also, the exit or discharge end of the various filter containers are manifolded and connected to a common pure or clean gas collection line. Appropriate connect and disconnect valves are provided at the inlet and discharge outlets of each of the filter containers. Moreover separate dust discharge tubes are provided leading to the filter containers the pre-precipitator. Hence, this known equipment solves the problem of providing a space saving association between filter containers and dust pre-precipitators, using relatively simple sealing techniques vis-a-vis the outer atmosphere, while at the same time improving maintenance of the filter containers. Specifically here a space saving arrangement is attained by arranging the various filter containers around the dust pre-precipitator, which in fact avoids the need for double sealing at the outlet or discharge of the filters.

However, it was found that the distribution of the prededusted gas to the individual filters and filter containers still can stand some improvement as far as regular operation is concerned and to be maintained particularly when one or the other filter is temporarily operationally removed for purposes of cleaning. Moreover, it was found that the number of connect and disconnect valves, that are subject to considerable wear should be lowered.

DESCRIPTION OF THE INVENTION

It is an object of the present invention to provide a new and improved dedusting arrangement, including plural filter containers and a pre-precipitating stage, whereby the distribution of prededusted gas to the individual filter containers is to be improved, while the number of requisite connect and disconnect valves is reduced.

In accordance with the preferred embodiment of the present invention, it is suggested to improve the arrangement that is the object of the invention, by deflecting in an upward direction gas that leaves the pre-precipitator, particularly in the zone of a dust capturing or collecting bag so that the precleaned gas enters the filters individually and from below. The invention therefore combines the advantage of the known devices whose filters are around the pre-precipitator as was outlined above, with the avoidance of a very expensive connect and disconnect valve for each of the filter containers, which in the past were deemed necessary to be inserted in the flow path above each filter entrance or inlet. Moreover, the deflection flow ensures that the filter elements receive gas flow in an optimum fashion which enhances their use life. The pre-precipitator can at the same time be used for evaporation cooling which of course is another space and cost saving feature avoiding in particular a separate evaporation cooler.

Optimum flow conditions, as far as the flow into the individual filter containers from below are concerned are approached further in accordance with another feature of the invention, according to which the filter containers each are provided with a funnel or funnel like transition between the filter elements and dust bag of the dust pre-precipitator. The flow of the precleaned gas is distributed into the filter elements in an optimum fashion by the funnel device, while the speed is reduced which was found to be of advantage as far as the dust filter action is concerned.

Another improvement in accordance with the invention is suggested by providing between the dust pre-precipitator and the funnel shaped transition a two-way flap; in the direction of dust gas flow the flap is arranged downstream from the dust bag for a cleaning process of the respective filter. The flap changes position and is now downstream from the filter as a as the cleaning counterflow is concerned. The advantage of this feature is to be seen in individual and separate cleaning of each filter and if necessary separate extraction can be provided for each of the cleaned filter containers. It is important that the raw gas is not enriched in addition during the cleaning process by the dust that has been removed from a filter to be cleaned.

The invention is rendered more useful by connecting all dust extraction devices of the various filter containers to a circuit of tubing so as to permit automated dust extraction which automation can be included in the overall control system for the system as a whole. In realization of the last mentioned concept the circuit may be provided with a pneumatic dust conveying device.

Cleaning of a particular filter is carried out by a clean gas-cleaning principle, whereby each filter container is associated with and its upper exit is connected to a clean gas collecting manifold as well as to a feeder line for flushing and cleaning gas.

The device as a whole can be manufactured in a compact fashion and permits a compact design, while manufacture itself is quite economical. This is particularly realizable if the dust pre-precipitator is constructed in form of a central tubular post, supporting and having fastened to it the individual filter containers.

BRIEF DESCRIPTION OF THE DRAWINGS

While the specification concludes with claims particularly pointing out and distinctly claiming the subject matter which is regarded as the invention, it is believed that the invention, the objects and features of the invention, and further objects and features and advantages thereof will be better understood from the following description taken in connection with the accompanying drawings in which:

DESCRIPTION OF THE DRAWINGS

Figure 2:
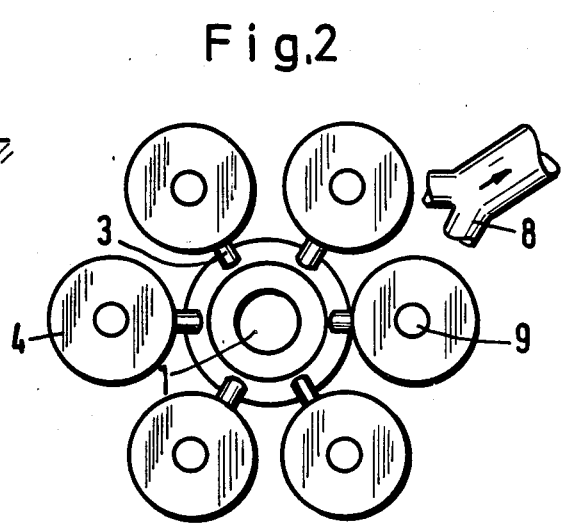
FIG. 2 is a top elevation of the device shown in FIG. 1.

Proceeding now to the detailed description of the drawings the figures illustrate basically a dust pre-precipitator 1 constructed in form of a central post of tubular design around which in this particular case six filters 4 have been arranged; see particularly FIG. 2. In each of the filter containers are disposed filter elements 4a comprised for example of filter hose suspended inside of the container by means of springs. Each filter container moreover has its inlet 3 connected a dust hopper 7 which is connected to the outlet of pre-precipitator 4. Raw gas 5 to be cleaned is charged into the pre-precipitator, at a point 1a and is pre dedusted. The coarse or gross particle dust as removed in device 7 is particularly collected by the dust hopper 7, in accordance with this first embodiment and example gates and discharge chambers 7a or 7b can be used, to discharge this collected dust from below hopper 7 and out of the system.

At the entrance of each of the filter containers 4 the gas inlet stud 3 is provided with a connect and disconnect valve 3a. Precleaned gas is thus deflected in the dust bag, in zone 2, to flow into inlets 3. A funnel shaped transition part 6 is connected to the inlet stud 3 to widen the flow area. Therefore precleaned gas is deflected in the lower portion of the pre-precipitator 1 and while dust gathers in the hopper 7, precleaned gas passes from the lower portion of prededuster 1 in upward direction into the several inlets 3 and is distributed on account of the funnel shaped transition 6 to the entire cross section in each of the filter containers 4. The filter elements 4a remove the residual dust and this relative fine dust as removed in the filters remains in the elements 4a.

Clean gas flows in the direction of the arrow 8a in upper direction, and is removed from the filter containers for as long as the respective valve 15 is open the assumption that an open check valve flap 8b (one per filter) permits cleaned gas to flow into the manifold 8.

A flap valve 10a for each filter connects the output of another annular manifold 9 to each filter. This valve flap 10a is opened for flushing and cleaning an operatively disconnected filter container, while the respective valve 8b closes on account of the fact that flushing gas is provided at higher pressure through manifold 9 than the clean gas pressure in collection chamber 8 whereby pressure is provided externally through a flushing gas blower (not shown). The pressure will exceed the pressure of the gas as it normally passes through the system for cleaning. The flushing gas itself is usually comprised of purified and clean gas and is blown from the top through the filter elements 4a so as to operate in a counter flow fashion. This way fine dust is removed in direction of arrow 16 and collected in the dust bag 7.

Valves 3a are provided essentially for completely separating a particular filter container on an individual basis from the overall system in order to remove the filter entirely for purposes of maintenance, repair or the like. The valve 3a is not closed for purposes of the cleaning operation.

Figure 3:
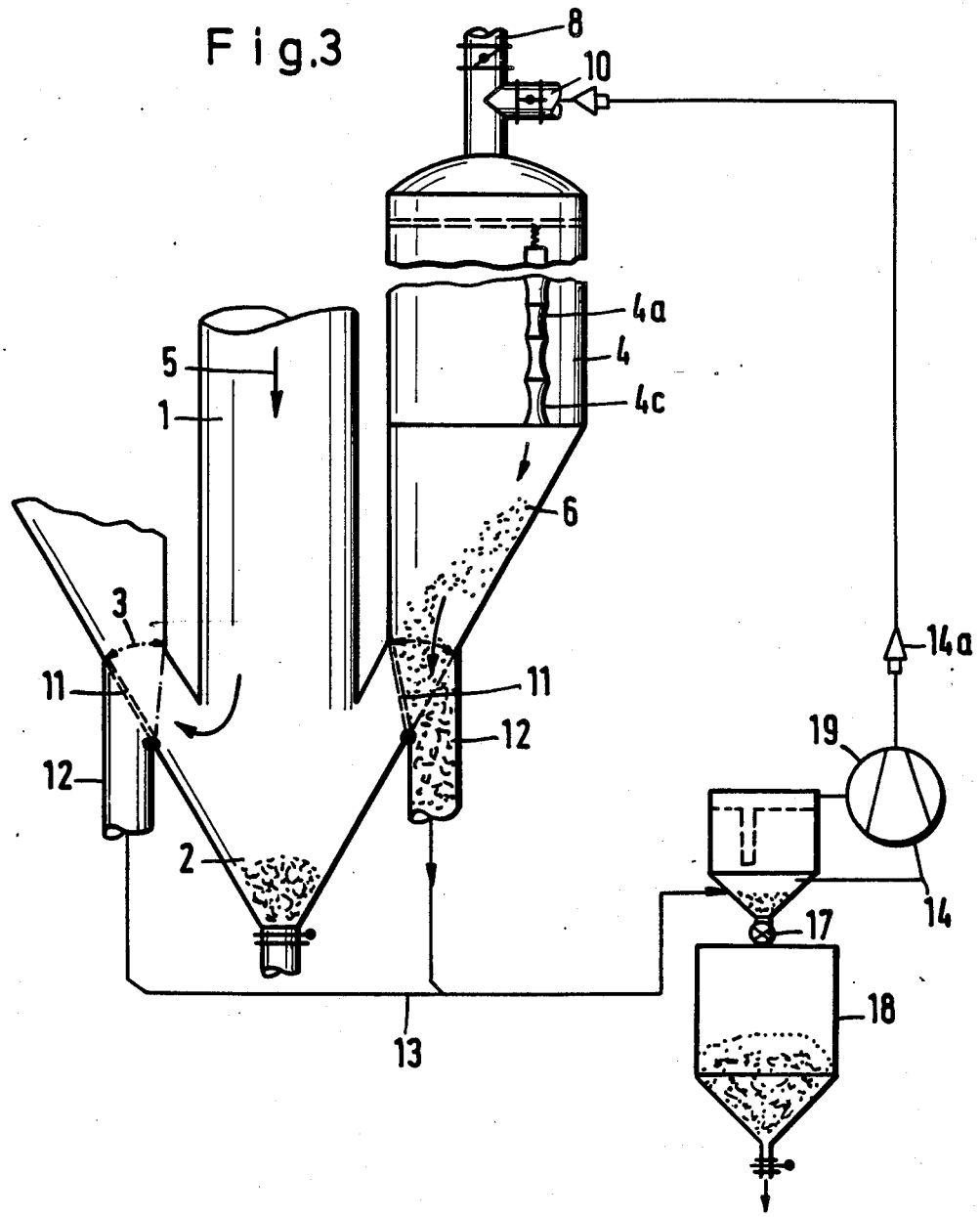
FIG. 3 illustrates a portion of the device shown in FIG. 1 and on an enlarged scale but showing a supplemental feature for dust removal and transport; the left hand/right hand distinction is also made here.

The left hand portion of FIG. 3 illustrates the operation of the dedusting and the right hand portion illustrates the cleaning operation of clogged filter elements 4a. The arrangement is particularly space saving and is based on the proposition that the dust pre-precipitator 1 is constructed as a central support post of tubular design so that the filter containers 4 can be affixed thereto or at least they are laterally supported on this tube 1a. Fastening and support elements are not shown, they are in this regard conventional. The pipe 1a as containing precipitation in down direction circumscribes preferably the members of the gate and chamber 7a and 7b in order to provide protection for them.

Figure 1:
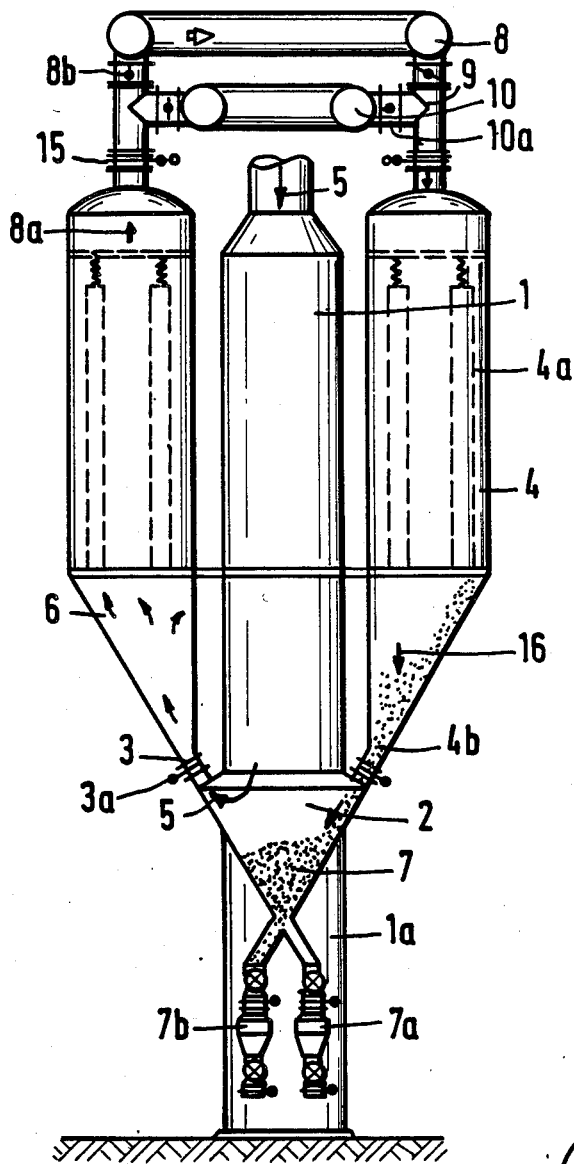
FIG. 1 is a vertical section through a dedusting plant and equipment constructed in accordance with the preferred embodiment of the present invention for practicing the best mode thereof; the figure moreover is to be construed in a biparted fashion, the left portion illustrates regular cleaning, the right portion illustrates a filter cleaning operation.

FIG. 3 actually illustrates a second embodiment which however can be interpreted as a supplement to the basic design shown in FIGS. 1 and 2. In this case additional features are provided for automatically removing the precipitated fine dust. A two-way flap 11 is provided inside of the raw gas stud 3 between the dust pre-precipitator 1 and the funnel shaped transition element 6. The left hand portion of FIG. 3 illustrates a two-way flap 11 in an open position so that the raw gas, as was described in conjunction with the description of FIG. 1, will flow from for purposes of removing dust from the particular filter container 4. The right hand portion of FIG. 3 shows the two-way flap 11 in a closed position. The flushing operator and particularly the upper manifold arrangement 8a and valves 8b and 10a are similar to FIG. 1.

The particular filter 4 with filter elements 4a will now be cleaned to remove fine dust. During this operation the filter hose surfaces 4c are forced inwardly by operation of the cleaning and flushing gas. A dust drawer and extractor 12 is disposed upstream of each of the two-way flaps 11, being downstream with respect to the flow of raw gas 5 during normal cleaning but upstream from the flap 11 in relation to the counterflowing cleaning flow. All dust extractors 12 are connected to an annular manifold 13. The manifold 13 in turn is connected to a pneumatically operating dust conveyor and transport facility 14, so that the precipitated fine dust is removed through a gate 17 tp be fed to bin 18 or the like.

The dedusted gas 14 will be returned by means of the blower 19 and through the return path 20 into the clean gas collector and manifold 8 to serve again as flushing and cleaning gas. It was found that the device as explained here for dedusting gas is particularly advantageously used in a dangerous environment, such as situations in which the gasses themselves are explosive and/or occur at rather high pressure as is the case for example in blast furnaces.

The invention is not limited to the embodiments described above, but all changes and modifications thereof, not constituting departures from the spirit and scope of the invention are intended to be included.

I claim:

1. Dedusting equipment using a dust pre-precipitator and a plurality of filters with dry filter elements and being arranged around the pre-precipitator comprising:

said pre-precipitator having a top inlet for receiving raw gas and being disposed, arranged and constructed for having said cleaning raw gas flowing down and emerging from the predust precipitator at a bottom thereof, there being a dust hopper provided at the bottom of the dust pre-precipitator for collecting dust particles having been, removed from the raw gas in the dust pre-precipitator;

the filters of the plurality are arranged around the dust pre-precipitator each having an inlet at the bottom and an outlet at the respective top;

means for connecting the dust pre-precipitator to the filters of the plurality at respective inlets thereof, so as to obtain a reversal of gas flow as it flows out of the bottom of the pre-precipitator through the dust hopper and into the filters through the respective inlets thereof;

means connected to the filter tops for extracting clean gas from the top of said filters; and means for selectively charging cleaning gas into individual ones of said filters and also from the tops thereof.

2. Equipment as in claim 1, the device for extraction being manifolded through a common collecting line, the means for selectively feeding flushing gas also including a manifold and valve means for obtaining selectively counter flow into individual ones of said filters.

3. Equipment as in claim 1, each of said filter including a funnel shaped transition, disposed between filter elements in said filter and said inlet for the respective filter.

4. Equipment as in claim 3, including a two-way flap valve disposed between the funnel and the dust pre-precipitator, further including:

a dust extraction device disposed adjacent to the two-way flap valve so that counter flowing cleaning gas passing through said filter in down direction will be guided away from the dust hopper into said extraction device.

5. Equipment as in claim 4, all of said extraction devices being annularly manifolded.

6. Equipment as in claim 5, said annular manifold including means for pneumatic dust transport.

* * * * *